United States Patent
Campbell

(10) Patent No.: US 7,478,404 B1
(45) Date of Patent: Jan. 13, 2009

(54) SYSTEM AND METHODS FOR EVENT IMPACT ANALYSIS

(75) Inventor: John Anderson Campbell, Canton, GA (US)

(73) Assignee: EMC Corporation, Hopkinton, MA (US)

( * ) Notice: Subject to any disclaimer, the term of this patent is extended or adjusted under 35 U.S.C. 154(b) by 815 days.

(21) Appl. No.: 10/812,498

(22) Filed: Mar. 30, 2004

(51) Int. Cl.
G06F 3/00 (2006.01)
G06F 9/44 (2006.01)
G06F 9/46 (2006.01)
G06F 13/00 (2006.01)

(52) U.S. Cl. .................................................. 719/318
(58) Field of Classification Search .................. 719/318
See application file for complete search history.

(56) References Cited

U.S. PATENT DOCUMENTS

| 7,197,489 | B1 * | 3/2007 | Gauvin et al. | 707/1 |
|---|---|---|---|---|
| 7,222,329 | B2 * | 5/2007 | Cole et al. | 717/101 |
| 7,421,704 | B2 * | 9/2008 | Young | 719/318 |
| 2002/0026433 | A1 * | 2/2002 | Kuiper | 706/45 |
| 2002/0091989 | A1 * | 7/2002 | Cole et al. | 717/102 |
| 2002/0138571 | A1 * | 9/2002 | Trinon et al. | 709/204 |
| 2004/0237077 | A1 * | 11/2004 | Cole et al. | 717/162 |

OTHER PUBLICATIONS

Casati, F. and Discenza, A., "Supporting workflow cooperation within and across organizations", 2000, ACM Press, Proceedings of the 2000 ACM Symposium on Applied Computing, vol. 1, J. Carroll, E. Damiani, H. Haddad, and D. Oppenheim, Eds., pp. 196-202.*
Adii, A., Botzer, D., Etzion, O., and Yatzkar-Haham, T., "Monitoring business processes through event correlation based on dependency model", 2001, ACM Press, Proceedings of the 2001 ACM SIGMOD international Conference on Management of Data, T. Sellis, Ed., pp. 610.*

* cited by examiner

*Primary Examiner*—Meng-Ai An
*Assistant Examiner*—KimbleAnn Verdi
(74) *Attorney, Agent, or Firm*—Chapin IP Law, LLC; Barry W. Chapin, Esq.

(57) ABSTRACT

A conventional business enterprise has a number of departments each depending on an information processing infrastructure. Operational anomalies in the information processing infrastructure may have a detrimental effect on one or more of the business processes. A rule engine associates network events with the business processes which the network events impact. The rule engine identifies and processes relations between event-generating manageable entities on the network. The rule engine computes, based on the relations between the various manageable entities, manageable entities having an effect on other manageable entities. Upon occurrence of an event, the rule engine employs the relations to determine which other manageable entities are indirectly affected by the event. The rule engine reports the event and affected manageable entities to identify the business processes which experience resulting operational deficiencies.

20 Claims, 7 Drawing Sheets

SYSTEM AND METHODS FOR EVENT IMPACT ANALYSIS

BACKGROUND OF THE INVENTION

Conventional managed information environments provide an information processing infrastructure for a particular business workflow. The business workflow has business processes, typically organized as departments, each handling a particular business process. The typical business enterprise, therefore, has a number of departments each depending on the information processing infrastructure for supporting the business process or processes for which the department is responsible.

In such a business enterprise, many business processes depend on the information processing infrastructure for support of routine business activities. Accordingly, consistent ongoing operation, or "uptime" of the information processing infrastructure, is significant. Often, the business processes each depend on the operation of the information processing infrastructure in different ways. Therefore, operational anomalies or deficiencies in the information processing infrastructure may have a detrimental effect on one or more of the business processes. Depending on the reliance of each of the business processes on the information processing infrastructure, a particular operational anomaly may have a different effect on each of the business processes. In other words, failure of a particular entity, such as a server of a disk array host for example, may have a null, minor, or substantial effect on a given business process.

SUMMARY

In a conventional business enterprise, a particular group or external management organization often operates and maintains the information processing infrastructure. The technical nature of the information processing infrastructure generally lends itself better to operational support from proficient operators, rather then intervention with nontechnical users. However, such operators may not be familiar with the business operations which the information processing infrastructure supports. Accordingly, the impact that a technical problem or occurrence in the information processing infrastructure has on the higher level business processes may not be readily apparent.

In a typical conventional managed information environment, such as a storage area network (SAN) operable to coordinate access to mass storage devices by a set of users, the storage area network interconnects a plurality of storage device nodes and associated interconnection nodes. The storage area network therefore includes a variety of nodes, or manageable entities, for providing mass storage retrieval services to users, such as storage devices (e.g. disc drive arrays), connectivity devices (e.g. switches and routers), and conventional host computers for executing software components called agents for monitoring and controlling the nodes in the storage area network. Each of the nodes in the storage area network may have a dependency, and therefore a relation, to another node in the storage area network. Depending on the arrangement of the business processes supported by the SAN, each node may support one or more of the business processes. Events and/or occurrences at a particular node may have an indirect effect on other nodes, and consequently, on the business processes which the node supports.

Further, service impact monitoring (SIM) applications are known which purport to receive a particular failure indication and identify the affected business processes. Such a SIM application receives an event occurrence and a particular object, or manageable entity, experiencing the failure indication. In a storage area network, it would be beneficial to identify the relations between the manageable entities and enumerate indirect effects of events at one manageable entity upon other manageable entities in the storage area network.

In a conventional managed information environment network, therefore, lower level operational anomalies may not be readily attributable to higher level business processes which may experience detrimental operation as a result. The invention as defined by the present claims is based, in part, on the observation that events and/or other detrimental occurrences are often not readily associated with the business processes that the anomaly impacts. In other words, a network occurrence, such as a malfunction or failure, on a particular piece of network hardware will not readily indicate the particular departments in the business enterprise which may experience service irregularities or interruptions as a result. A monitoring application which operates on the network typically generates an event indicative of such an occurrence, and network operators familiar with the monitoring application may therefore respond accordingly. However, business side users, who typically employ the network and components therein as a service, may not understand which business processes are affected by the event.

Configurations of the invention substantially overcome the above described shortcomings with respect to the association of network events with the enterprise business processes, or operations, which the network events impact. In the configurations described below, a rule engine identifies and processes relations between manageable entities on the network. A business side user defines the types of manageable entities for which event impact analysis is desired. The rule engine computes, based on the relations between the various manageable entities, which of the other manageable entities have an effect on the manageable entities under observation. Upon occurrence of an event, the rule engine employs the relations to determine which other manageable entities are indirectly affected by the event. The rule engine enumerates the affected manageable entities, and reports the event and affected manageable entities to an impact manager, such as a SIM application, which correlates the event to the business processes which may experience operational deficiencies as a result.

In further detail, the method for identifying the impact of event occurrences in a managed information such as a storage area network includes identifying a configuration of managed entities of interest in the storage area network, and determining relations between the managed entities of interest and other managed entities in the storage area network, in which the relations are indicative of an event at a managed entity having an affect on another managed entity. The rule manager then registers for notification of events affecting, based on the determined relations, the identified manageable entities. At a subsequent time, the registered server, on behalf of the rule engine, receives an indication of an event affecting a registered manageable entity, and determines, via the determined relations, other manageable entities affected by the received event.

The rule engine determines the other affected manageable entities by traversing the relations between managed entities from the manageable entity directly affected by the event, and identifying, from the traversing, manageable entities of interest affected by the received event. The rule manager then stores the relations between the manageable entities, maintaining the relations to be mapped in response to corresponding events.

Upon occurrence of an event, the rule engine determines the affected manageable entities by traversing a mapping of events and affected manageable entities, and matching the received event to the mapping of events and affected manageable entities. The rule engine determines the relations by parsing the manageable entities to identify manageable entities including manageable entities effected directly or indirectly by an event at another managed entity. The rule engine then traverses the relations using the manageable entity corresponding to the matching event to determine affected manageable entities.

The server, on behalf of the rule engine, registers for notification of events affecting manageable entities of interest by identifying types of events affecting a particular manageable entity. The server also registers for other manageable entities of interest relative to the particular manageable entity, and which may be indirectly impacted, based on the determined relations. In the exemplary configuration, the server invokes an event notification mechanism operable within the storage area network. Alternate notification services may be employed.

In particular configurations, the rule engine determines the affected managed entities by invoking a relation service operable to identify other managed entities effected by a particular managed entity according to the relations. Alternatively, determining affected managed entities includes traversing a cache of effected managed entities and selectively invoking the relation service if no match is found in the cache.

The impacted manageable entities are indicative of a set of business processes, or business operations, dependent on particular manageable entities, and the rule engine integrates, via an adaptor, with a Service Impact Monitor (SIM) application, operable to receive an indication of the identified manageable entity of interest and the accompanying triggering event. The service impact monitor is therefore operable to apply the manageable entity of interest to determine affected business processes.

The invention as disclosed above is described as implemented on a computer having a processor, memory, and interface operable for performing the steps and methods for monitoring and processing timer events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The invention as defined by the present claims is based, in part, on the observation that events and/or other detrimental occurrences are often not readily associated with the business processes which are affected. In other words, a network occurrence, such as a malfunction or failure, on a particular piece of network hardware will not readily indicate the particular departments in the business enterprise which may experience service anomalies or interruptions as a result. A monitoring application which operates on the network typically generates an event indicative of such an occurrence, and network operators familiar with the monitoring application may therefore respond accordingly. However, business side users, who typically employ the network and components therein as a service, may not be informed or understand which business processes are affected by the event.

Configurations of the invention substantially overcome the above described shortcomings with respect to the association of network events with the enterprise business processes, or operations, which the network events impact. In the configurations described below, a rule engine identifies and processes relations between manageable entities on the network. A business side user defines the types of manageable entities for which event impact is desired. The rule engine computes, based on the relations between the various manageable entities, which of the other manageable entities have an effect on the manageable entities under observation. Upon occurrence of an event, the rule engine employs the relations to determine which other manageable entities are indirectly affected by the event. The rule engine enumerates the affected manageable entities, and reports the event and affected manageable entities to an impact manager which correlates the event to the business processes which may experience operational deficiencies as a result.

Figure 1:
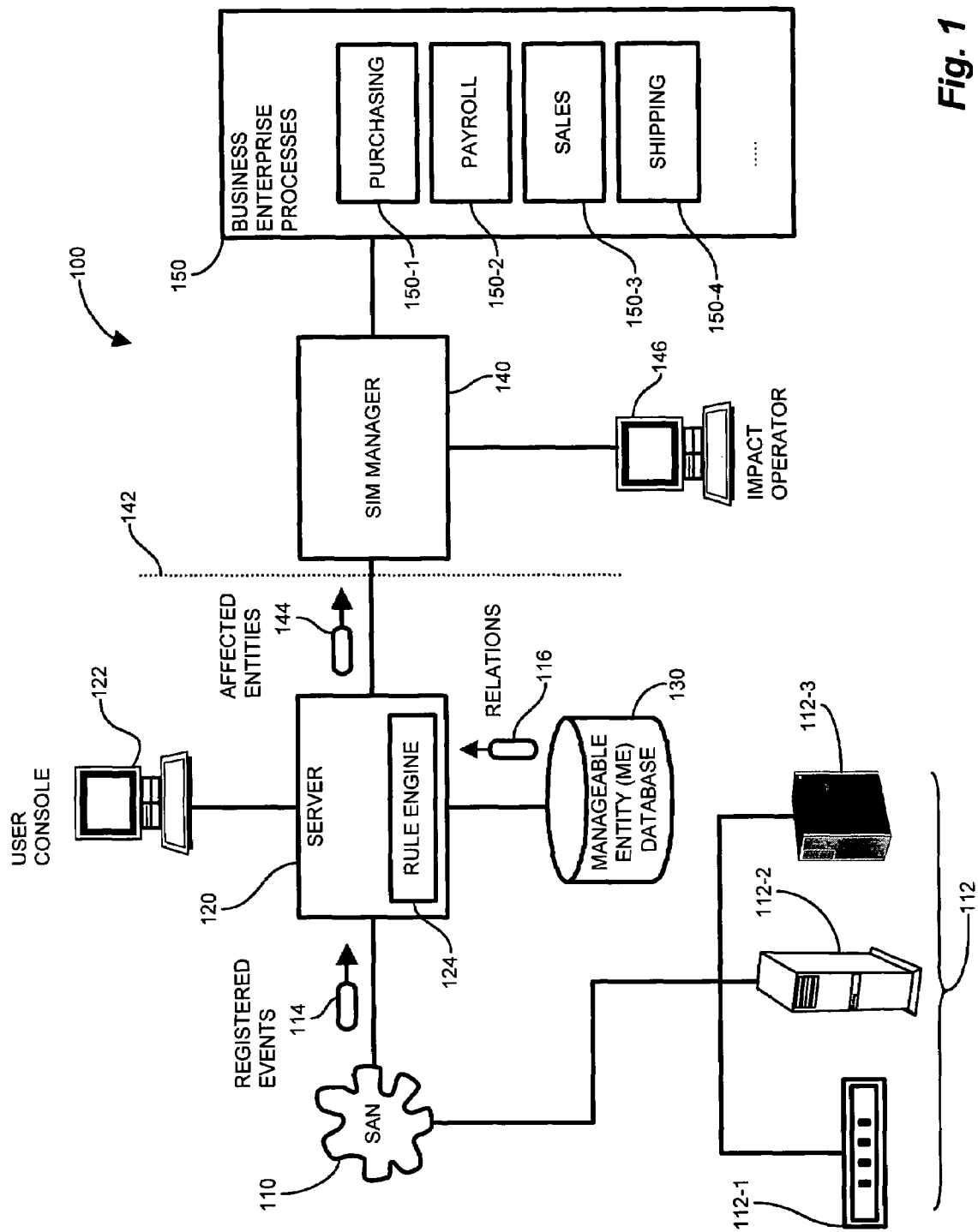
FIG. 1 is a context diagram of an exemplary managed information environment including a storage area network and suitable for use with the event impact analysis and reporting mechanism.

FIG. 1 is a context diagram of an exemplary managed information environment including a storage area network, suitable for use with the event impact analysis and reporting mechanism. Referring to FIG. 1, a storage area network 100 interconnects a plurality of manageable entities 112, including interconnectivity elements such as switches 112-1, servers 112-2, and hosts 112-3. A server 120 connects to the SAN 110 for monitoring and controlling the manageable entities 112 in the SAN 110. A user console 122 is operable by a user or operator for manipulating the manageable entities 112. The manageable entities 112 are operable to generate events 114, typically in the form of alerts which indicate occurrences relevant to the operation of the SAN 110. The manageable entities 112 may have relations 116 associating each manageable entity 112 with one or more other manageable entities 112, as will be discussed further below. A manageable entity database (DB) 130 stores information about the manageable entities 112, events 114 and relations 116 concerning the manageable entities 112.

A Service Impact Monitor (SIM) 140 is accessible via an Information Technology (IT)/Business Process interface 142 for receiving and analyzing the impact of events occurring at affected entities 144, as computed by the server 120 via a rule engine 124, discussed further below with respect to FIG. 3. The SIM manager 140 correlates the affected entities 144 with business enterprise processes 150, and is accessible via an impact (SIM) operator 146. Exemplary business enterprise processes 150 include purchasing 150-1, payroll 150-2, sales 150-3 and shipping 150-4, and may include others depending on the particular business enterprise.

Figure 2:
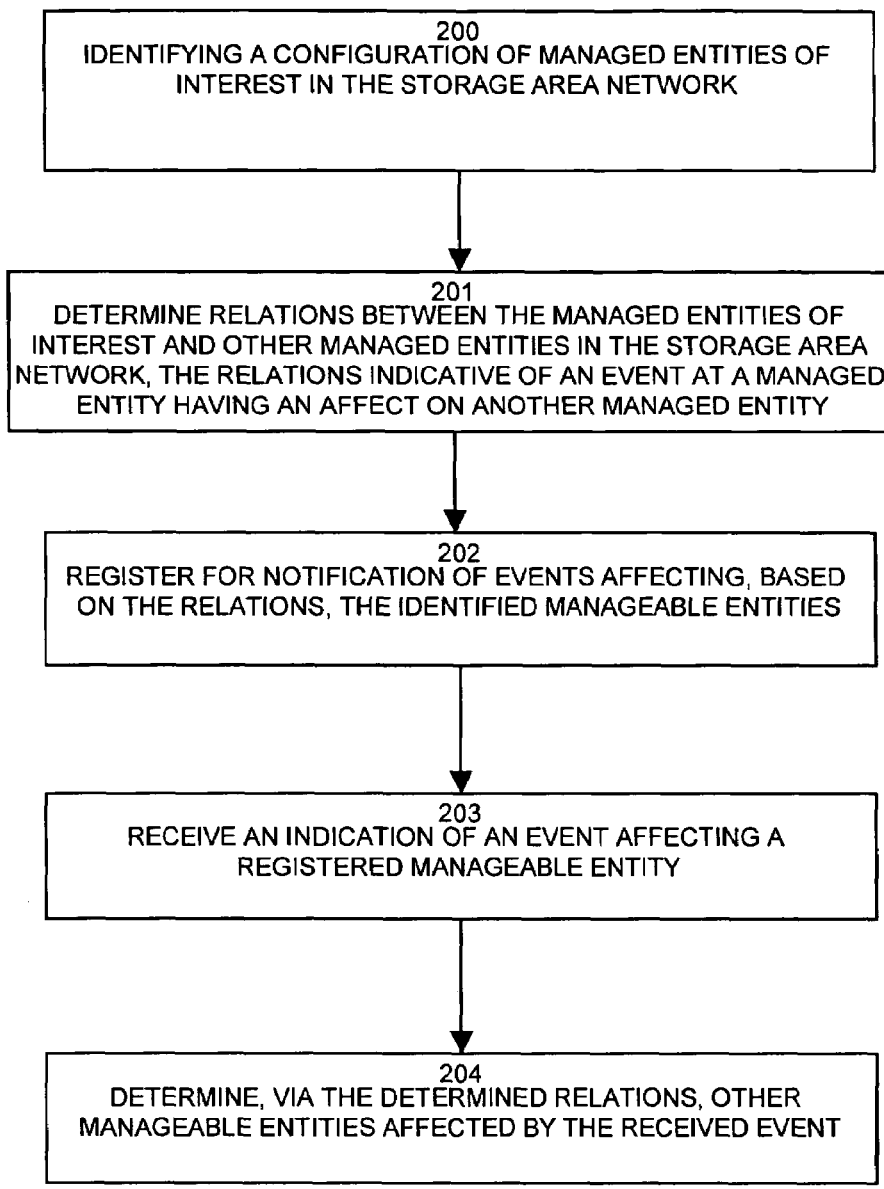
FIG. 2 is a top-level flowchart of event impact analysis as described herein.

FIG. 2 is a top-level flowchart of event impact analysis as described herein. Referring to FIG. 2, the method for identifying the direct and indirect impact of event occurrences involves identifying a configuration of managed entities of interest in the storage area network, as depicted at step 200. The configuration is stored in a non volatile entry such as a configuration file 132 (FIG. 3) in the manageable entity DB 130. The configuration file 132 specifies the entities, events, and indirection of occurrences for which SIM manager 140 reporting is desired. The type of manageable entities 112 depends on the granularity of the monitoring, and is usually at a high level such as a host or server, however may be at lower levels of granularity as well. Such manageable entities 112 are the manageable entities of interest, for which the rule engine computes relations to other manageable entities 112, discussed further below. In the exemplary configuration, the manageable entities 112 include hosts such as storage arrays, servers, connectivity elements such as switches, ports, and media connecters such as fiber adapters. Other manageable entities 112 or objects are likewise monitorable, such as agents, hubs, routers and various interfaces such as Ethernet adapters, frame engines, etc.

The configuration file 132 also specifies the events to be monitored. In a large system, such as the exemplary SAN environment 100 illustrated, many events corresponding to various types of occurrences are defined. In order to avoid inundation of event traffic, recipients of events typically limit, or filter, scrutiny to a set of predetermined events. Accordingly, the configuration files 132 specifies types of events which the rule engine 124 receives and analyzes. Further, the configuration file specifies whether direct or indirect impact of the events is sought. Typically, a user elects indirect impact, in order to ascertain the attenuated impact, or effect, of a particular occurrence. If direct impact only is requested, then the rule engine performs analysis only of the objects directly affected by an event.

The rule engine 124 determines relations 136 between the managed entities 112 of interest and other managed entities 112 in the storage area network 100, as disclosed at step 201. The relations 136 are indicative of an event at a managed entity 112 of interest having an effect, or impact, on another managed entity 112. Therefore, the configuration file 132 specifies the manageable entities 112 of interest, for which direct occurrences (i.e. occurrences triggering an event) are observable, and the relations 136 indicate other manageable entities 112 which are indirectly affected via the relation. Generally, the relation 136 derives from a direct connectivity between the manageable entities 112, such as a fiber adapter failing and compromising a port and server 112-2 which it supports. The determined relations 136 are then stored in a non-volatile area such as the ME database 130.

The rule engine 132 then registers for notification of events affecting the identified manageable entities 112, as per the determined relations 136, depicted at step 202. The server 120 has an event notification mechanism, not specifically shown, which is common in information processing systems of a nontrivial size. The event notification mechanism informs a designated object, such as the server 120, of a significant occurrence in the system. Such notification takes the form of an event, which the event notification system transmits to registered entries depending on the event. Accordingly, the rule engine 124 registers for each event affecting a manageable entity 112 of interest. Such events include events directly affecting the manageable entity 112 of interest, and also event which indirectly affect the manageable entity 112 of interest via the relations 136.

At a successive time, as a result of registration, the server 120 receives an indication of an event affecting a registered manageable entity 112, as shown at step 203. Accordingly, the server invokes the rule engine 124 to traverse the relations 136 and determining, by mapping the determined relations, other manageable entities 112 affected by the received event. The rule engine 124 therefore identifies the manageable entities 112 affected by the occurrence triggering the event. Typically, such indirectly affected manageable entities 112 are upstream entities dependent on the event-producing manageable entity for generating throughput, such as a host 112-3 receiving a data stream via a fiber adaptor. The rule engine 124 employs the relations to determine and map the indirect effect of such events, by traversing the relations 136, as will now be described further.

Figure 3:
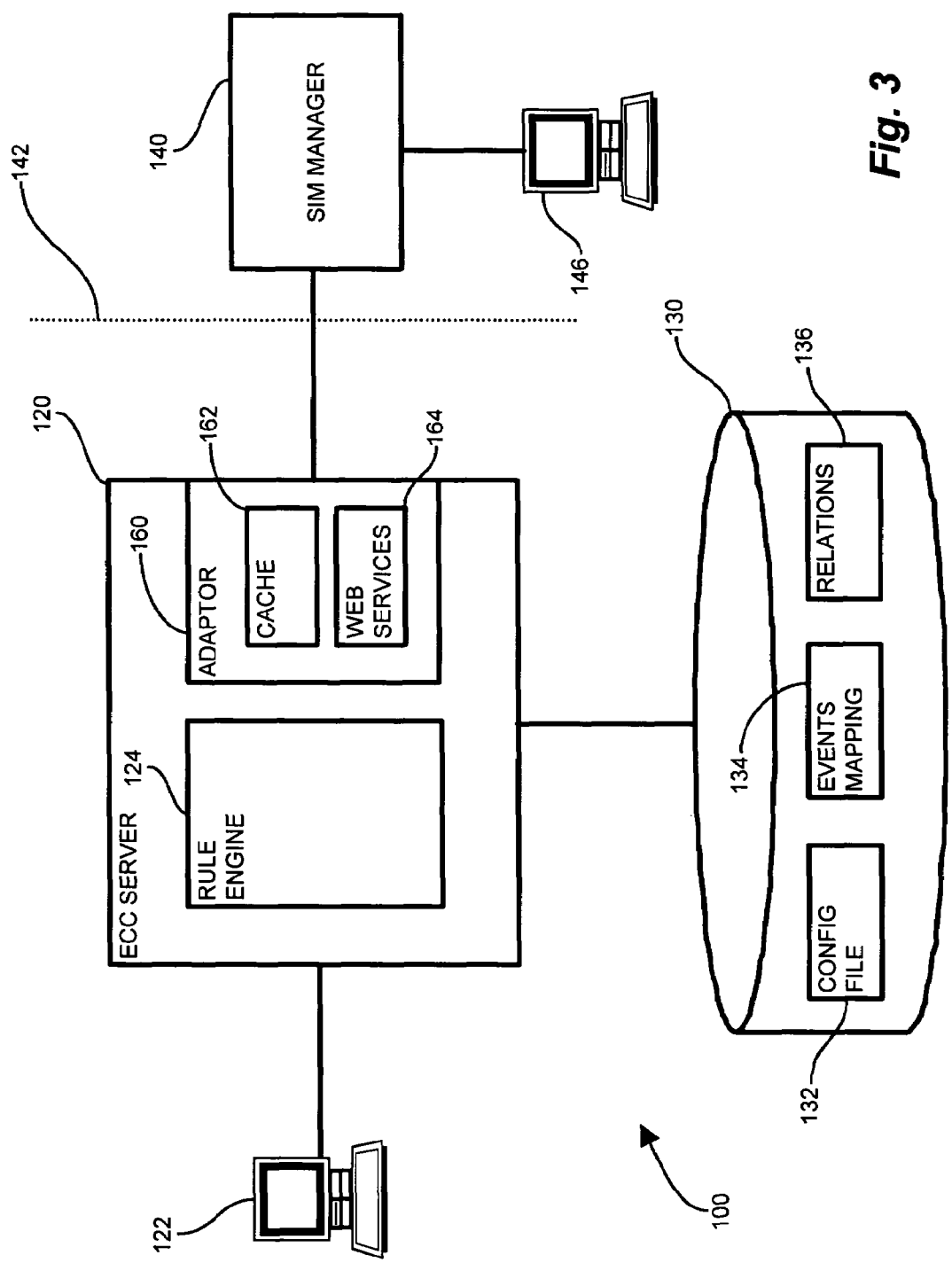
FIG. 3 is a block diagram of a server in the exemplary managed information environment operable according to the system of the present invention.

FIG. 3 is a block diagram of the server 120 in the exemplary managed information environment 100 operable according to the system of the present invention. Referring to FIG. 3, the exemplary environment 100 is a storage area network environment and the exemplary server 120 is an ECC (EMC Control Center) server, marketed commercially by EMC corporation of Hopkinton, Mass.), in communication with the SAN 110. The ECC server includes the rule engine 124 and an adaptor 160. The adaptor 160 provides an application specific interface to the SIM manager 140 and is operable to provide the IT/Business process interface 142. The adaptor 160 further includes a cache 162 and a network services module 164 for identifying relations as will now be discussed in greater detail. The manageable entity DB 130 includes the configuration file 132, an event mapping 134, and a set of relations 136. Briefly, the configuration file identifies the manageable entities 112 (objects) of interest, the types of events 114 to be reported, and whether direct and/or indirect events 114 are sought. The event mapping 134 identifies events 114 which affect a particular manageable entity 112, and the relations 136 identify which manageable entities 112 have an effect on other manageable entities 112.

In the exemplary configuration, configuration file 132, event mapping 134, and relations 136 are non-volatile files operable to be fetched into memory for processing. In various configurations, these files 132, 134 and 136 may take other forms of volatile and non-volatile storage, such as flat files, indexed files, volatile memory tree structures, or other data structures, such a cache described further below.

Figure 4:
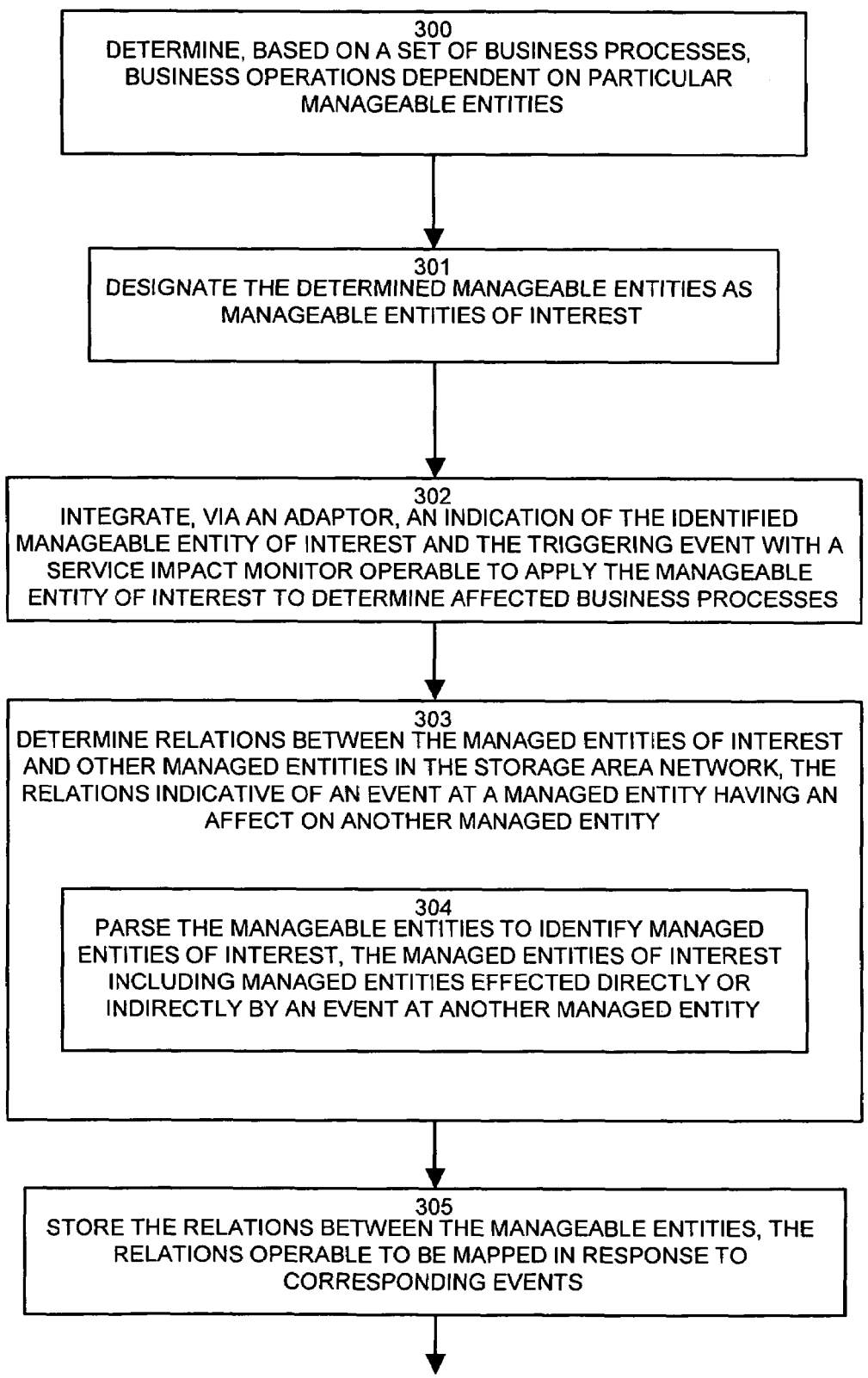
FIGS. 4-6 are a flowchart of the event impact analysis in greater detail.
Figure 5:
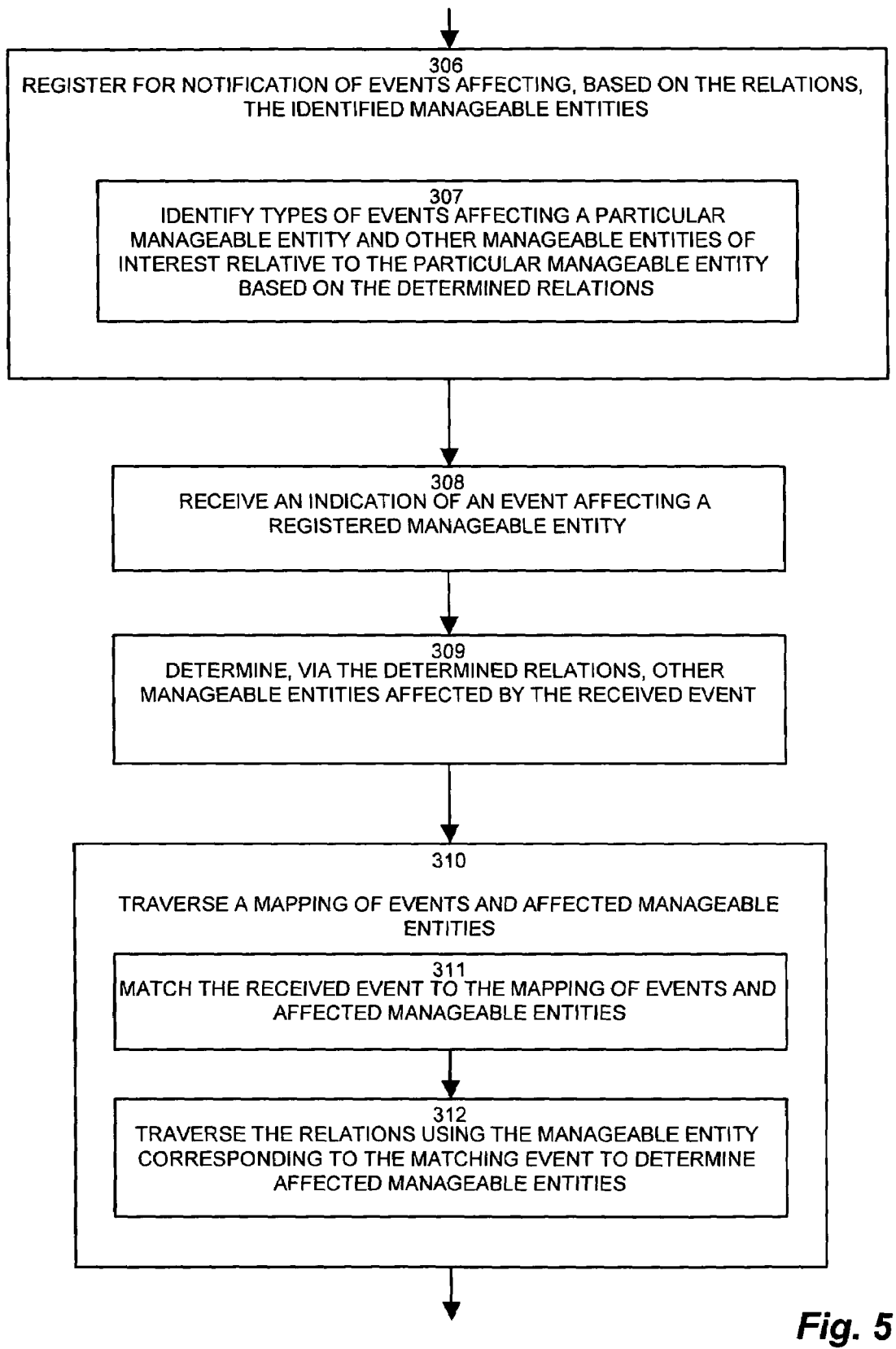
Figure 6:
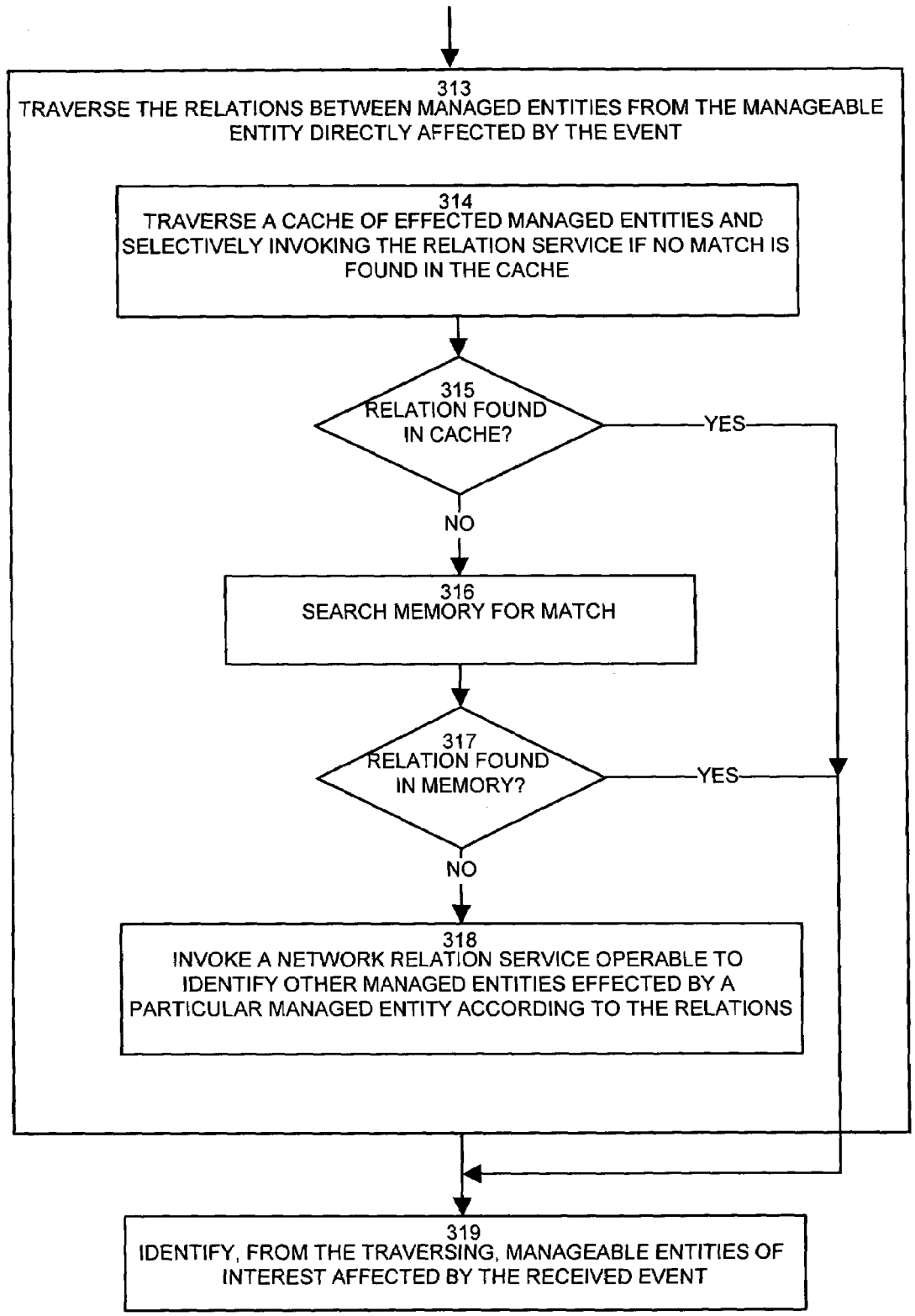

FIGS. 4-6 are a flowchart of the event impact analysis as in FIG. 2 in greater detail. Referring to FIGS. 3-6, the SIM manager 140 or other manner of correlating the relevant business operations identifies the configuration by determining, based on a set of business processes 15, business operations dependent on particular manageable entities, as depicted at step 300. Typically, the impact operator 146 of the SIM manager 140 identifies the business processes 150 (practices) concerned and the corresponding manageable entities 112 which are employed by, and therefore potentially impact, the business practices. For example, a disk array host supporting a payroll application, or a server handling sales, indicate a correlation of business processes 150 to manageable entities 112.

The configuration file 132 designates the determined manageable entities as manageable entities of interest by enumerating the manageable entities 112, the types of events, and the direct/indirect nature of events sought in the configuration file 132, as shown at step 301. Note that a particular type of an event may correspond to, or indicate interest in, a number of individual events for which feedback is desired. In other words, the configuration file 132 lists manageable entities 112 which the SIM manager 140 perceives as affecting, or impacting, one or more business processes 150. In this manner, the SIM manager 140 identifies a configuration of managed entities 112 of interest in the storage area network 110.

Having the manageable entities 112 of interest codified in the configuration file 132, the ECC server 120 integrates, via an adaptor 160, an indication of the identified manageable entity 112 of interest and the triggering event 114 with a service impact monitor (SIM) operable to apply the manageable entity 112 of interest to determine affected business processes 150, as depicted at step 302. The adaptor 160 is a software interface entity which operates as an Application Programming Interface (API) to the SIM manager 140 from the ECC server 120. Therefore, the adaptor 160 allows the ECC 120 server to communicate the events and corresponding manageable entities 112 to the SIM manager 140 for identification of the business processes 150 impacted by the event. As indicated above, as the SIM manager 140 may take the form of various software entities and/or applications, the SIM manager 140 receives impact analysis information indicative of affected entities 144 via the adaptor.

The rule engine then determines the relations 136 between the managed entities 112 of interest and other managed entities 112 in the storage area network 110, in which the relations are indicative of an event at a managed entity having an affect on another managed entity, as depicted at step 303. Typically, an event at one manageable entity 112 may have an indirect effect on one or more other manageable entities 112. The relations 132 indicate this effect in an iterative "cause and effect" manner adapted to a hierarchical set of dependencies as is typical in a storage area network 110. The rule engine 124 examines interconnections and other dependencies between the manageable entities 112, and determines when a deficiency or failure of one manageable entity 112 has an effect on another manageable entity 112.

The rule engine 124, in determining the relations 136, further parses the manageable entities 112 in the SAN 110 to identify managed entities 112 effected directly or indirectly by an event at another managed entity 112, as shown at step 304. Therefore, the resulting relations 136 are traversable to determine other manageable entities 112 which may be compromised or disabled by a failure of a predicate manageable entity 112.

The rule engine 124 then stores the relations 136 between the manageable entities, in the manageable entity database 130, as depicted at step 305. The relations 136 are operable to be mapped in response to corresponding registered events 114. In conjunction with storing the relations, the configuration file 134 is employed to define the events mapping 134, which is an enumeration of the events to the manageable entities of interest which the specific events directly effect, or impact, as will be discussed further below upon occurrence of an event.

The server 120, on behalf of the rule engine 124, registers for notification of events affecting, based on the relations, the identified manageable entities 112, as depicted at step 306. The registration provides notification of events 114 stored in the event mapping 134 which are indicative of event occurrences directly affecting manageable entities 112 of interest. Therefore, registration for notification of events affecting manageable entities of interest includes identifying types of events affecting a particular manageable entity and other manageable entities of interest relative to the particular manageable entity based on the determined relations, as depicted at step 307. Upon registration, the ECC server is designated to receive events occurring in the SAN which are deemed to affect manageable entities 112 of interest. The manageable entities 112 of interest are those designated by the configuration file 132 to be business process 150 sensitive, and those manageable entities which may have an indirect effect via dependencies on the manageable entities 112 of interest. The events mapping file 134 lists events 114 corresponding to the registrations, along with the manageable entity 112 experiencing (i.e. directly affected) by the event. The relations 136 provide the complementary indication of the manageable entities which are indirectly affected by the event, and may indicate a sequence or chain of dependencies from the direct impact manageable entity to multiple indirectly impacted manageable entities 112.

Following initialization and storage of the events mapping 134 and the relations 136 based on the configuration file 132, the server 120 receives events on behalf of the rule engine. Accordingly, at step 308, the server 120 receives an indication of an event affecting a registered manageable entity 112, and determines, via the relations 136, other manageable entities 112 indirectly affected by the received event 114. Determination of the affected manageable entities 112 includes traversing a mapping of events 134 and affected manageable entities 112, as depicted at step 311, and matching the received event 114 to the mapping of events and affected manageable entities 112, thereby providing one or more manageable entities 112 affected by the event 114, as shown at step 312. Note that multiple manageable entities 112 may be listed in the events mapping 134 as directly affected by a particular event, and the manageable entities 112 affected subsequently increases after mapping the impact into the relations 136. The rule engine then employs the directly affected manageable entity 112 to traverse the relations 136 using the manageable entity corresponding to the matching event to determine affected manageable entities, as depicted at step 312.

Accordingly, determining the other manageable entities 112 further includes traversing the relations between managed entities from the manageable entity 112 from the event mapping 134 directly affected by the event 114, as depicted at step 313. In the particular exemplary implementation shown, the rule manager 124 employs the adapter 160 to retrieve the relations 136. Depending upon performance and resources available, the adaptor employs one or more of a high speed cache of recently accessed relations, a main memory or disk fetch, and a net service mechanism. In the exemplary configuration shown, determination of the effected managed entities 112 further includes first traversing the cache 162 of effected managed entities 112 and selectively invoking the relation service 164 if no match is found in the cache 162, as depicted at step 314.

The rule engine determines if a match was found in the cache 162, as depicted at step 315, and if so, control passes to step 319. If no match was found in the cache 162, the rule engine traverses main memory of the server 120 for a match, as shown at step 316. A check is performed, at step 317, and if a match was found, control passes to step 319. If no match is found in the server 120 main memory, the rule engine invokes a network relation service 164 operable to identify other managed entities effected by a particular managed entity according to the relations, as depicted at step 318.

The rule engine may employ one or more of the cache 162, server 120 main memory, and network service for identifying the relations. Further, the relations 136 may be predetermined for storage in server 120 memory, or may be determined dynamically via invocation of the network relations service 164. Available server 120 resources and performance constraints drive the relation 136 traversal implementation. The outcome of step 313 and corresponding substeps is an aggregation of impacted manageable entities 112 from the traversal.

Accordingly, determining the affected managed entities further includes identifying, from the traversing, manageable entities 112 of interest affected by the received event 114, as depicted at step 319. The identified manageable entities 144 are then available to the SIM manager 140 for display to an operator 146 so as to ascertain the full impact of a particular event, now described with reference to a specific example in FIG. 8.

Figure 7:
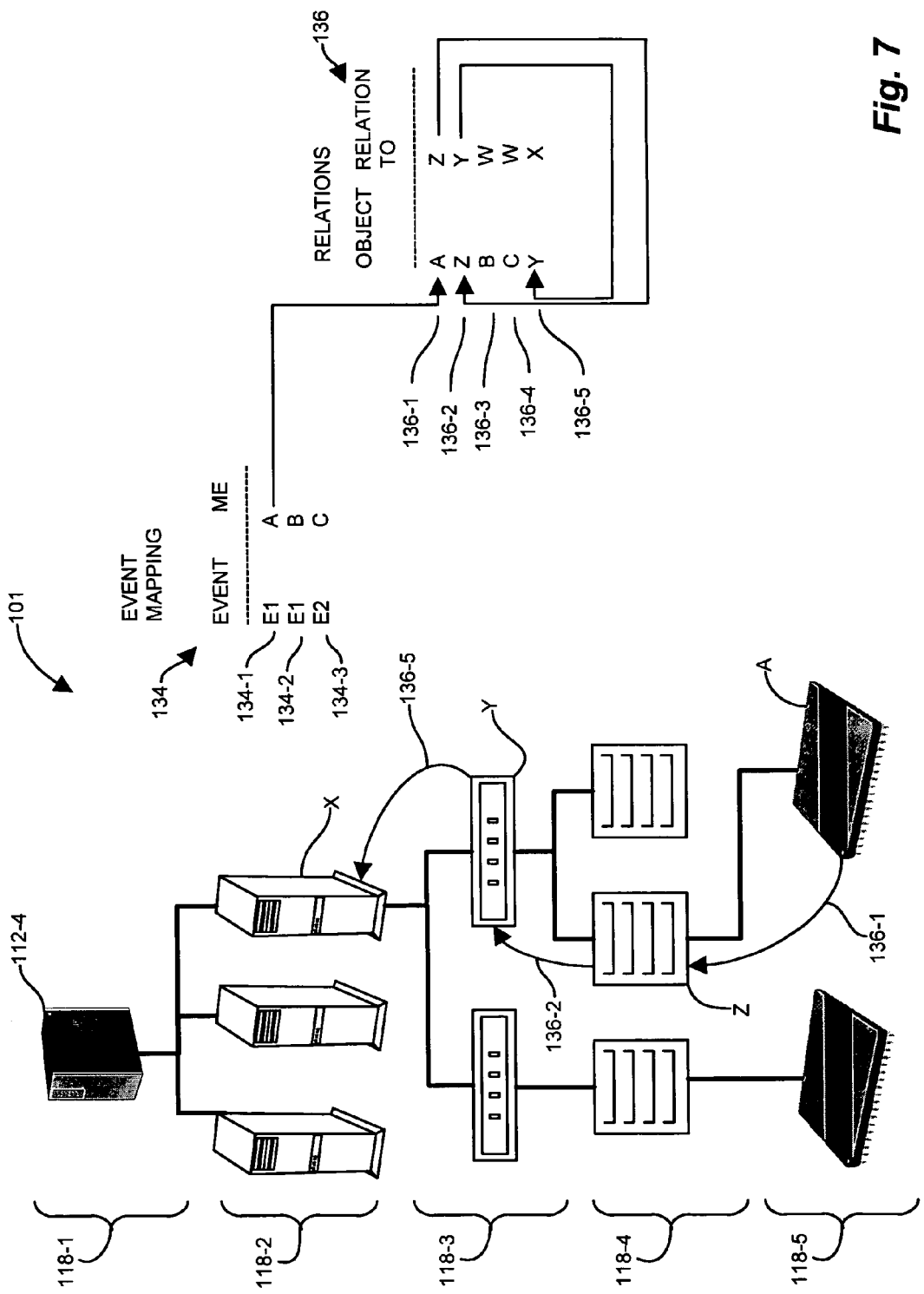
FIG. 7 is an example of configuring and processing an event occurrence according to the event impact analysis mechanism as described herein.

FIG. 7 is an example of configuring and processing an event occurrence according to the event impact analysis mechanism as described herein. Referring to FIGS. 8 and 3, an exemplary configuration 101 is shown, including a server X, switch Y, port Z, and fiber adapter A, all supporting an exemplary host 112-4. The configuration includes a plurality of manageable entity types 118, including hosts 118-1, servers 118-2, switches 118-3, ports 118-4, and fiber adapters 118-5, arranged in a hierarchical dependency, partially illustrated for space convenience. The actual "fan out" of an operational managed information network is likely to be substantial. The event mapping 134, such as a file or other storage medium, includes the mappings 134-1 . . . 134-3. The relations 136 include exemplary relations 136-1 . . . 136-5, as will now be discussed in further detail.

In the exemplary configuration 101 shown, the configuration file 132 specifies, inter alia, an interest in servers 112-2 for events of type E1. As indicated above, in the exemplary configuration, the rule engine 124 computes the event mappings 134 and the relations 136 from the interconnectivity of the manageable entities (objects) 112 in the configuration 101 and the entities 112 of interest from the configuration file 132. The rule engine 124 determines that an event of type E1 may directly affect fiber adapter A, and accordingly, the corresponding event mapping 134 includes an entry 134-1 corresponding to fiber adapter as affected by event E1. Further, the interconnectivity of the configuration 101 indicates a relation 136-1 from fiber adapter A to port Z, another relation 136-2 from port Z to switch Y, and a relation 136-3 from switch Y to server X, as shown in the relations 136.

The rule engine 132, in the exemplary configuration, computes the event mappings 134 and relations 136, from the configuration file 132 and the configuration 101 interconnections upon startup. The server 120 registers for notification of events of interest based on the mappings 134 and relation 136. Therefore, the rule engine 124 may map the registered events 114 to affected manageable entities 112 upon occurrence. Alternate configurations may compute relations dynamically and/or employ alternate event notification and mapping mechanisms.

The relations and events, in the particular exemplary arrangement, take the form of a service model structure, operable to be codified as a data structure and instantiated as an object according to an implementation language such as C++, XML, Java, and others as is known to those of skill in the art. The indication of affected entities 144 sent from the server 120 to the SIM manager 140 takes the form of the service model. The service model as described herein is further operable to store the event mapping 134 and the relations 136, in whole or in portions corresponding to particular manageable entities, for processing in the rule engine 124. Further the service model data and/or portions thereof are operable for storage in the ME database for storing the event mapping 134 and the relations 136 data, as described above.

In particular, in an exemplary object oriented implementation platform such as C++, the service model is a class, and includes one or more enumerations of the relations 136, in the form of objects, properties, and relations, and enumerations of the event mapping 134, including a definition and affected objects corresponding to the event. Alternate implementations may employ other object and data structures.

The event impact analysis and reporting mechanism disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for event impact analysis and reporting as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for event impact analysis and reporting has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. In a storage area network, a method for identifying the impact of event occurrences comprising:

identifying a configuration of managed entities of interest in the storage area network, identifying the configuration further comprising:

determining, based on a set of business processes, business operations dependent on particular manageable entities; and designating the determined manageable entities as manageable entities of interest;

determining relations between the managed entities of interest and other managed entities in the storage area network, the relations indicative of an event at a managed entity having an affect on another managed entity, wherein determining the relations further comprises parsing the manageable entities to identify managed entities of interest, the managed entities of interest including managed entities effected directly or indirectly by an event at another managed entity;

caching recently accessed relations to provide a cache of effected managed entities;

registering for notification of events affecting, based on the determined relations, the designated manageable entities;

receiving an indication of an event affecting a registered manageable entity; and determining, via the determined relations, other manageable entities affected by the received event, the determining comprising traversing the cache of effected managed entities and selectively invoking a relation service operable to identify other managed entities effected by a particular managed entity according to the relations if no match is found in the cache.

2. The method of claim 1 wherein determining the other manageable entities further involves:

traversing the relations between managed entities from the manageable entity directly affected by the event; and identifying, from the traversing, manageable entities of interest affected by the received event.

3. The method of claim 2 further comprising storing the relations between the manageable entities, the relations operable to be mapped in response to corresponding events.

4. The method of claim 3 wherein determining affected manageable entities further comprises:

traversing a mapping of events and affected manageable entities;

matching the received event to the mapping of events and affected manageable entities; and traversing the relations using the manageable entity corresponding to the matching event to determine affected manageable entities.

5. The method of claim 1 wherein registering for notification of events affecting manageable entities of interest further comprises identifying types of events affecting a particular manageable entity and other manageable entities of interest relative to the particular manageable entity based on the determined relations.

6. The method of claim 1 further comprising integrating, via an adaptor, an indication of the identified manageable entity of interest and the triggering event with a service impact monitor operable to apply the manageable entity of interest to determine affected business processes.

7. The method of claim 1 wherein the determining the other manageable entities further involves checking a memory of a local server for a match of the managed entities of interest, the matching managed entities of interest used in the determining, otherwise the determining checks for the match of the managed entities of interest in a database of the managed entities of interest.

8. A computerized method for correlating operational events with enterprise processes to evaluate impact of network occurrences comprising:

identify a model of events and objects, the model operable to enumerate events corresponding to objects and further operable to enumerate objects corresponding to other objects via a relation and wherein objects are manageable entities in a storage area network, the manageable entities responsive to a server and console controlling the storage area network;

selecting, based on a level of overview scrutiny of the network, objects indicative of performance to monitor, selecting the objects indicative of performance to monitor further comprising:

determining, based on a set of business processes, business operations dependent on particular manageable entities; and designating the determined manageable entities as manageable entities of interest for monitoring;

enumerating events operable to affect one of the selected objects to be monitored;

building, by observing interconnections between the objects, virtual relationships between objects, interrelations indicative of a dependency relation between objects;

identify events directly affecting at least one of the selected objects;

traverse the built virtual relationships to determine objects indirectly affected by the identified directly affected object;

registering with an event service to receive events corresponding to an occurrence of an enumerated event;

awaiting an occurrence of an event corresponding to a registered event;

reporting the event and the indirectly, affected objects; and identifying, in a SIM manager, enterprise processes corresponding to the indirectly affected objects.

9. The method of claim 8 further comprising:

displaying via a graphic output device, affected manageable entities; and tagging affected objects indicative of the sequence of relations affecting successive objects, the tagging indicative of direct and indirect impact of the events.

10. A server for identifying the impact of event occurrences in a managed information network comprising a computer processing device responsive to computer program code on a computer readable storage medium that, when executed, causes the computer processing device to perform steps, the server further comprising:

an interface to a manageable entity database having a configuration file, the interface operable to access a configuration file indicative of managed entities of interest in a storage area network, the configuration file for identifying a configuration by:

determining, based on a set of business processes, business operations dependent on particular manageable entities; and designating the determined manageable entities as the manageable entities of interest;

a rule engine operable to determine relations between the managed entities of interest and other managed entities in the storage area network, the relations indicative of an event at a managed entity having an affect on another managed entity, the rule engine further operable to register for notification of events affecting, based on the relations, the designated manageable entities, wherein the rule engine is operable to parse the manageable entities to identify managed entities of interest, the managed entities of interest including managed entities effected directly or indirectly by an event at another managed entity; and an adapter responsive to the rule engine for receiving an indication of an event affecting a registered manageable entity, the adapter further operable to determine, via the determined relations, other manageable entities affected by a received event; and wherein the adapter is further operable to traverse a cache of effected managed entities and selectively invoking a relation service if no match is found in the cache.

11. The server of claim 10 wherein the rule engine is further operable to:

traverse the relations between managed entities from the manageable entity directly affected by the received event; and identify, from the traversing, manageable entities of interest affected by the received event.

12. The server of claim 10 further comprising a relations file in the manageable entity database operable to store the relations between the manageable entities, the relations operable to be mapped in response to corresponding events.

13. The server of claim 12 wherein the rule engine is further operable to determine affected manageable entities by:

traversing a mapping of events and affected manageable entities;

matching the received event to the mapping of events and affected manageable entities; and traversing the relations in the relations file using the manageable entity corresponding to the matching event to determine affected manageable entities.

14. The server of claim 10 wherein the rule engine registers for notification of events affecting manageable entities of interest by identifying types of events affecting a particular manageable entity and further identifying other manageable entities of interest relative to the particular manageable entity based on the determined relations.

15. The server of claim 10 wherein the adapter is operable to invoke a relation service operable to identify other managed entities effected by a particular managed entity according to the determined relations.

16. The server of claim 10 wherein the configuration file is adapted to identify, based on a set of business processes, business operations dependent on particular manageable entities.

17. The server of claim 13 wherein the adaptor is operable to communicate an indication of the designated manageable entity of interest and the triggering event to a service impact monitor operable to apply the manageable entity of interest to determine affected business processes.

18. The server of claim 10 wherein the rule engine is further operable to:

check a memory of a local server for a match of the managed entities of interest using a found match to determine the relations between the managed entities of interest and the other managed entities in the storage area network, otherwise the rule engine checks for the match of the managed entities of interest in a database of the managed entities of interest.

19. A computer program product having a computer readable medium operable to store computer program logic embodied in computer program code encoded thereon for identifying the impact of event occurrences in a managed information network comprising:

computer program code for identifying a configuration of managed entities of interest in the storage area network, identifying the configuration further comprising:

determining, based on a set of business processes, business operations dependent on particular manageable entities;

selecting, based on a level of overview scrutiny of the managed information network, objects indicative of performance to monitor, selecting the objects indicative of performance to monitor; and designating the determined manageable entities as manageable entities of interest comprising parsing the manageable entities to identify managed entities of interest, the managed entities of interest including managed entities effected directly or indirectly by an event at another managed entity;

computer program code for determining relations between the managed entities of interest and other managed entities in a storage area network, the relations indicative of an event at a managed entity having an affect on another managed entity;

computer program code for registering for notification of events affecting, based on the determined relations, the designated manageable entities;

computer program code for receiving an indication of an event affecting a registered manageable entity; and computer program code for determining, via the determined relations, other manageable entities affected by a received event, the determining comprising traversing a cache of effected managed entities and selectively invoking a relation service if no match is found in the cache.

20. A server having a processor for identifying the impact of event occurrences in a managed storage area network comprising:

means for identifying a configuration of managed entities of interest in the storage area network, identifying the configuration further comprising:

determining, based on a set of business processes, business operations dependent on particular manageable entities;

selecting, based on a level of overview scrutiny of the storage area network, objects indicative of performance to monitor, selecting the objects indicative of performance to monitor;

designating the determined manageable entities as manageable entities of interest comprising parsing the manageable entities to identify managed entities of interest, the managed entities of interest including managed entities effected directly or indirectly by an event at another managed entity;

means for determining relations between the managed entities of interest and other managed entities in the storage area network, the relations indicative of an event at a managed entity having an affect on another managed entity;

means for registering for notification of events affecting, based on the determined relations, the designated manageable entities;

means for receiving an indication of an event affecting a registered manageable entity; and means for determining, via the determined relations, other manageable entities affected by a received event, the determining comprising traversing a cache of effected managed entities and selectively invoking a relation service if no match is found in the cache.

* * * * *